(No Model.)  2 Sheets—Sheet 1.
G. H. MEMORANK.
MINE WATER GATE.
No. 304,218.  Patented Aug. 26, 1884.
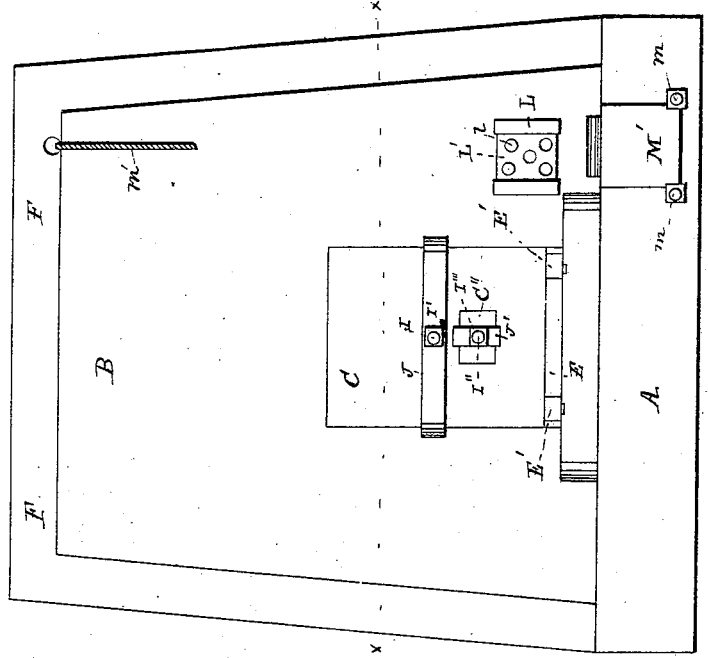
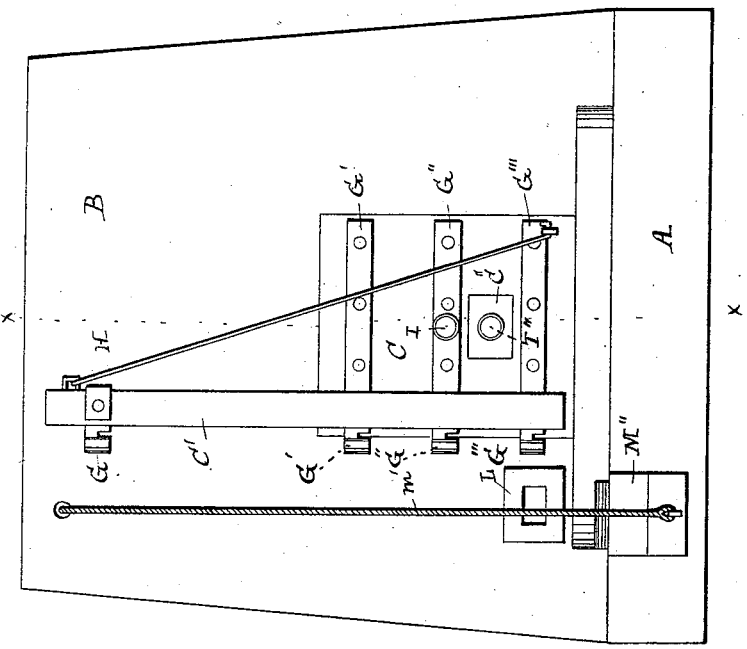
WITNESSES
Morton Toulmin
Edwin L. Bradford
INVENTOR
George H. Memorank
W. H. Wills & Co.
*Attorney*

(No Model.) 2 Sheets—Sheet 2.

G. H. MEMORANK.
MINE WATER GATE.

No. 304,218. Patented Aug. 26, 1884.

WITNESSES
Morton Gonhum
Edwin L. Bradford

INVENTOR
George H. Memorank
W. H. Wills & Co.
Attorney

UNITED STATES PATENT OFFICE.

GEORGE H. MEMORANK, OF ASHLAND, PENNSYLVANIA.

MINE WATER-GATE.

SPECIFICATION forming part of Letters Patent No. 304,218, dated August 26, 1884.

Application filed April 22, 1884. (No model.)

*To all whom it may concern:*

Be it known that I, GEORGE H. MEMORANK, a citizen of the United States, residing at the borough of Ashland, in the county of Schuylkill and State of Pennsylvania, have invented certain new and useful Improvements in Mine Water-Gates, of which the following is a specification, reference being had therein to the accompanying drawings.
This invention relates to new and useful improvements in mine water-gates, and has for its object to prevent the passage of water in coal or other mines in all cases where it would interfere with the work of mining. This object is accomplished by the devices illustrated in the accompanying drawings, forming a part of this specification, in which—

Figure 3:
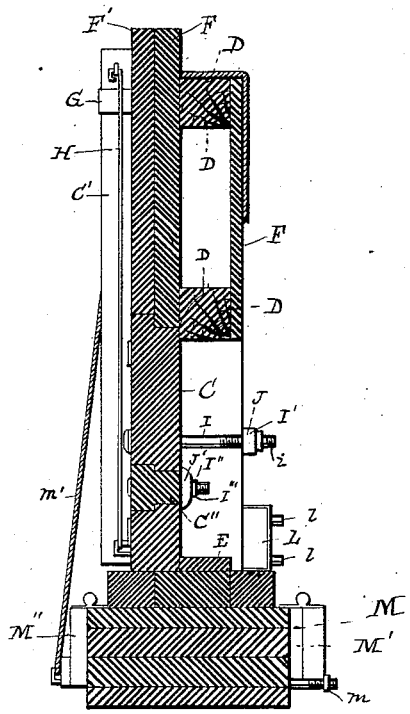
Figure 4:
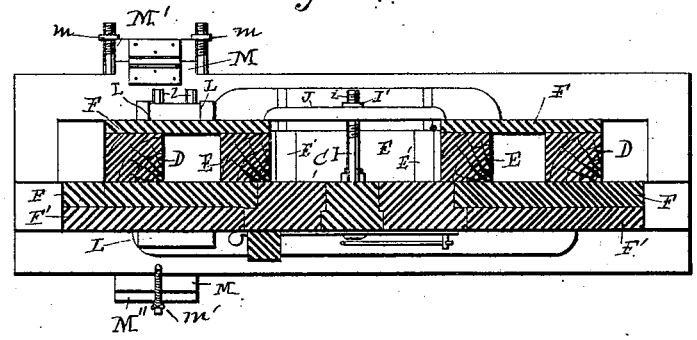

Figure 1 is an elevation taken from one side of the gate. Fig. 2 is an elevation taken from the opposite side. Fig. 3 is a transverse section taken on the line $x$ $x$ of Fig. 1; Fig. 4, section on the line $x$ $x$ of Fig. 2.

The letter A indicates the coal or rock on which the bulk-head and the mine water-gate are erected. The bulk-head is formed of a suitable frame-work made of stout timbers framed or otherwise fastened together, and then planked up on both sides, a suitable opening being left for the introduction of the gate, and for other purposes hereinafter described. The bulk-head is intended to be placed across the gangway of the mine, so as to fill the entire opening and prevent the passage of water when the gate is closed.
The letter B indicates the bulk-head.

C is the gate or main door.

D are the frame-timbers.

E is the gate or door frame.

F F' are the planking, to be of planks about three inches thick, that represented by the letter F to be placed crosswise, as affording greater strength and security from the passage of water.

The lower frame, E, of the gate has two openings to allow the passage of vehicles, which are provided with blocks E', by means of which these openings may be closed. The gate is intended to be made double, the open space between the planking and the frame forming part of the gate to be filled in with dry horse or mule manure, whereby the joints are made tight to prevent the passage of water. On the outside of the gate is secured a stout piece of timber, C', in a vertical position, which extends to near the top of the bulk-head. At the top of this timber is secured a hinge, G, and a rod, H, which serves the purpose of a brace and extends diagonally to the lower corner of the gate C, where it is fastened by a bolt or otherwise. Heavy hinges G' G'' G''' extend across and are firmly bolted to the gate C. The center hinge, G'', and the gate C are both perforated to admit the passage of a long bolt, I, which is provided with a nut, I', and thread $i$, and also passes through a suitable opening in a bar, J, which, when the gate is shut, is extended across the gate-opening, as shown in Fig. 2, and when the nut is screwed up against the bar J the gate C is drawn forcibly against the frame E, and by this means a water-tight joint is made between the gate and the frame E.

Near the bottom of the gate C is a man-hole opening into which is fitted a stout plank, C'', which is provided with an opening for a bolt, I'', also threaded at one end, and furnished with a nut, I''', and a bar, J', by means of which the plank C'' is forcibly drawn against the gate C when it is desired to close this manhole therein.

L is a trough or pipe extending through the bulk-head, one end of which is provided with a perforated plate, L', and plugs $l$, by means of which one or more of these perforations may be closed, and thereby regulate the flow of water to the pump or pumps connected with the mine.

M is a pipe or box extending through the bulk-head. This pipe is provided with two flap-valves, M' M'', hinged thereto, one being placed on either end of the pipe, the valve M' being secured, when closed, by means of bolts and nuts $m$. The valve M'' is weighted, and is furnished with a cord, rope, or chain, $m'$, which passes through an opening in the bulk-head for that purpose, by means of which this valve may be opened from the opposite side of the bulk-head to that on which the valve is located. The box M is intended to provide a passage-way for the water when the door C is open.

It is intended to form the frame of the bulk-head of oak timbers about twelve inches square, and to set the bulk-head in solid in the coal or rock the full thickness of the frame, or farther, if found necessary. All the mortises and joints are to be plated with iron plates one-half of one inch thick and three inches wide, with a sufficient number of a proper size to give the required strength; and the whole structure is intended to be constructed and put up in the gangway of the mine in the dry season of the year, to be ready to protect the mine and miner at any time that the water may gather, and thereby protect the miner, operator, and mine from being drowned out and his mining operations stopped for weeks and months at a time. When the mine is drowned out, the work of mining is suspended and immense sums of money expended yearly in pumping and cleaning up the mine. This is one of the risks and troubles of mining.

Having described my invention, what I claim as my invention, and desire to secure by Letters Patent, is—

1. A bulk-head adapted to be fitted into the gangway of a mine, provided with a suitable gate, man-hole, pipes, and valves, as described, and for the purposes set forth.

2. In a mine water-gate, the bulk-head B, the gate C, suitably hinged thereto, having timber C' and man-hole C'', in combination with bolt I, nut I', and bar J, substantially as described, and for the purposes set forth.

3. The combination of bulk-head B with pipe L, having perforated plate L' and plugs l, as described, and for the purposes set forth.

4. In a mine water-gate, the bulk-head B, in combination with gate C, having hinges G' G'' G''', timber C', and brace H, substantially as described, and for the purposes set forth.

5. In a mine water-gate the bulk-head B, in combination with gate C, having hinges G' G'' G''', timber C', brace H, bolt I, and bar J, as described, and for the purposes set forth.

In testimony whereof I affix my signature in presence of two witnesses.

GEORGE H. MEMORANK.

Witnesses:
GEO. D. HAUGHAWOUT,
C. F. RUSSELL.